United States Patent [19]

Lukez

[11] Patent Number: 5,065,892
[45] Date of Patent: Nov. 19, 1991

[54] STRUCTURE FOR MOUNTING LIQUID LEVEL SENSORS AND THE LIKE IN LIQUID CONTAINERS

[75] Inventor: Rudy Lukez, Salt Lake City, Utah

[73] Assignee: Edo Corporation, Salt Lake City, Utah

[21] Appl. No.: 573,492

[22] Filed: Aug. 27, 1990

[51] Int. Cl.⁵ .............................................. B65D 25/00
[52] U.S. Cl. ..................................... 220/465; 220/320
[58] Field of Search ................... 220/86.1, 85 F, 85 S, 220/319, 320, 676, 465

[56] References Cited

U.S. PATENT DOCUMENTS

| | | | |
|---|---|---|---|
| 1,270,406 | 6/1918 | Goecke | 220/465 X |
| 2,041,427 | 5/1936 | Meyer | 220/465 X |
| 2,715,477 | 8/1955 | North | 220/320 |
| 3,559,844 | 2/1971 | Schlosberg | 220/465 |
| 4,699,294 | 10/1987 | Carlin, Jr. | 220/319 X |

Primary Examiner—Steven M. Pollard
Attorney, Agent, or Firm—Thorpe North & Western

[57] ABSTRACT

Fastening apparatus is provided for releasably holding a liquid-level sensor over an opening in a liquid container. An annular bracket is mounted about the opening for receiving the liquid level sensor, and an annular bracket extension is provided to project upwardly from the bracket, with the extension having a laterally projecting flange at its upper end. A holding ring is provided for placement over the bracket extension to overlie a sensor lip which projects laterally from a sensor. The sensor is positioned on the bracket and then the holding ring is positioned about the sensor to overlie the lip. The holding ring includes a laterally extending flange which is co-extensive with the flange of the bracket extension. A V-band clamp is removably fitted about the flanges of the bracket extension and holding ring to secure the flanges together and thus secure the holding ring over the lip of the sensor to secure the sensor in place.

5 Claims, 1 Drawing Sheet

STRUCTURE FOR MOUNTING LIQUID LEVEL SENSORS AND THE LIKE IN LIQUID CONTAINERS

BACKGROUND OF THE INVENTION

1. Field of the Invention

The present invention relates to mounting a structure for enabling the easy mounting and removal of a liquid level sensor from a pressure vessel such as a waste tank or water tank.

2. Prior Art

In many types of liquid containers and tanks, including water tanks and waste tanks used on aircraft, it is important to periodically monitor the liquid level in the tank, for example, to prevent overflow, to recognize when refilling is necessary, etc. This is done typically by mounting some type of liquid level sensor, such as a sonar or other electronic sensor, in the tank wall at an appropriate location to enable the sensor to periodically provide a reading of the liquid level in the tank.

The current approach to mounting such sensors involves the forming of an opening in the tank wall at the appropriate location, inserting the sensor into the opening but with a sensor flange preventing the sensor from dropping into the tank, and then securing the sensor in place in the opening with studs or bolts inserted through bores in the flange. An alternative approach is to use an annular bracket which fits over the sensor to overlie the sensor flange, with the bracket itself having a flange with openings through which bolts or studs may be inserted to secure the bracket, and thus the sensor, on the tank.

With these arrangements, any time the sensor needed maintenance or repair, all studs or bolts would need to be removed to allow removal of the sensor for the repair work. Thereafter, the sensor could be reinstalled by again inserting the studs or bolts in place. Such removal and reinstallation, of course, is time consuming, especially if the sensor is located at a difficult to reach position in a tank. Also, it is not uncommon for the studs or bolts to break during removal, requiring the finding and installation of new studs or bolts. Finally, if the studs or bolts are in place for some length of time, the liquid in the tank may cause rusting or deterioration of the studs or bolts so that they are even more difficult to remove for maintenance of the sensor.

SUMMARY OF THE INVENTION

It is an object of the invention to provide a simple and easy to use mounting structure for mounting a liquid level sensor in a liquid container or tank.

It is a further object of the invention to provide such a structure which allows for the easy removal and reinstallation of the sensor.

It is an additional object of the invention to provide such a structure which reduces the likelihood of breakage of any part of the structure during removal of the sensor.

It is also an object of the invention to provide such a structure in which a single-element fastener/latch allows for removal and reinstallation of the sensor.

The above and other objects of the invention are realized in a single-mount fastener for securing a liquid level sensor in the opening of a liquid-holding vessel. The fastener includes an annular bracket mounted to circumscribe an opening in the vessel in which the sensor in to be placed. The bracket includes a laterally extending flange mounted to the vessel about the opening, a support ring projecting upwardly from the flange, and an annular projection extending upwardly from the flange and about the support ring, and terminating in a second laterally extending flange. The sensor is disposable in the bracket and includes a flange itself which rests on the support ring. A holding ring is included for disposition on the projection to overlie the sensor flange when the sensor is placed in the bracket. The holding ring includes a laterally extending third flange, dimensioned to mate with and overlie the second flange. An annular clamp is provided for releasably clamping the third flange to the second flange so that the third flange may secure the liquid level sensor in the vessel opening.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
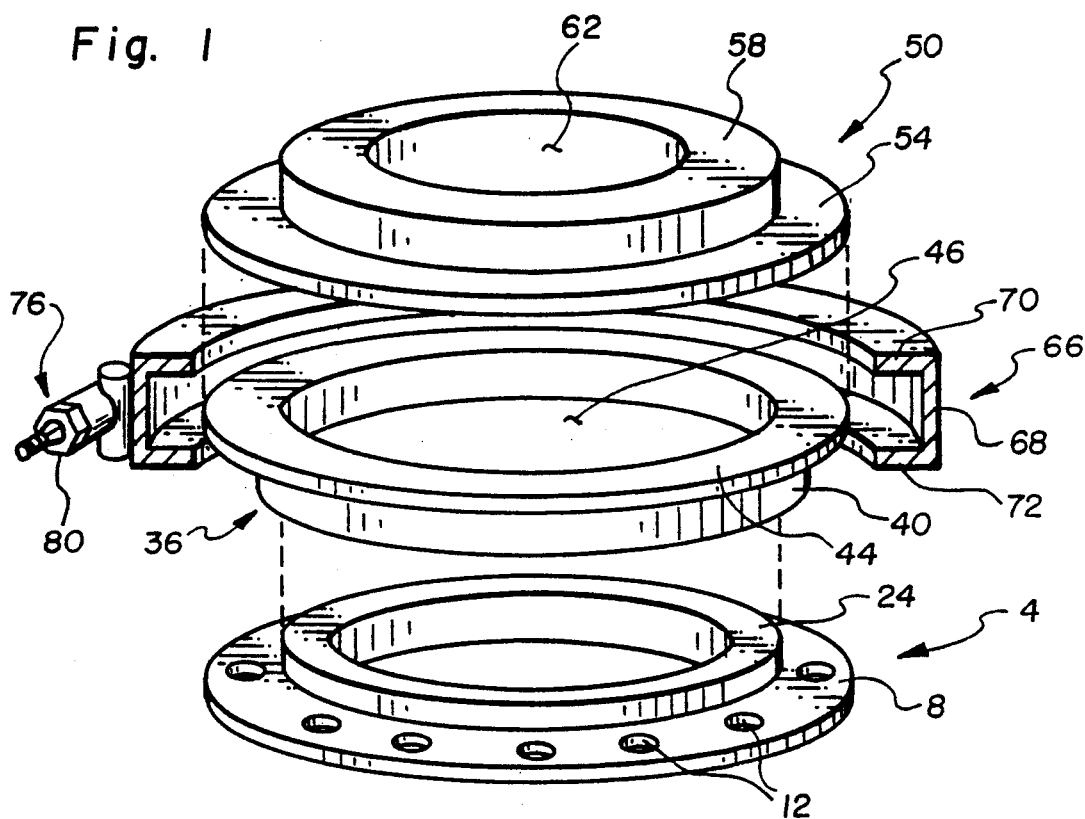
FIG. 1 shows a perspective, exploded, partially cross-sectional view of structure for mounting a liquid level sensor in a liquid container, made in accordance with the principles of the present invention.

Referring to the drawings, a conventional bracket 4 is shown to include a laterally projecting flange 8 having a plurality of openings 12 formed therein for receiving studs or bolts for bolting the bracket to a conventional liquid-containing tank 16 (FIG. 2) to circumscribe a tank wall opening 20. Extending upwardly from the flange 8 is an annular projection or ring 24, as best seen in FIG. 1. The bracket 4 is conventional in construction and use, and is occasionally used to affix a liquid level sensor, such as sensor 28 shown in FIG. 2, directly in a container opening, with the bracket being placed over a sensor flange or lip 32 which projects laterally from the main body of the sensor. This would be done simply by inserting studs or bolts in the openings 12 and bolting the bracket, with the sensor fitted therein, in the container wall.

An annular bracket extension 36 is mounted on and bonded to the bracket 4 so that a side wall 40 of the extension projects upwardly from the flange 8 of the bracket and from beside the projection 24. On the top of the side wall 40 of the extension 36 is a laterally projecting flange 44. The extension 36 could be bonded to the bracket 4, for example, by an epoxy adhesive or a similar secure bonding composition.

Figure 2:
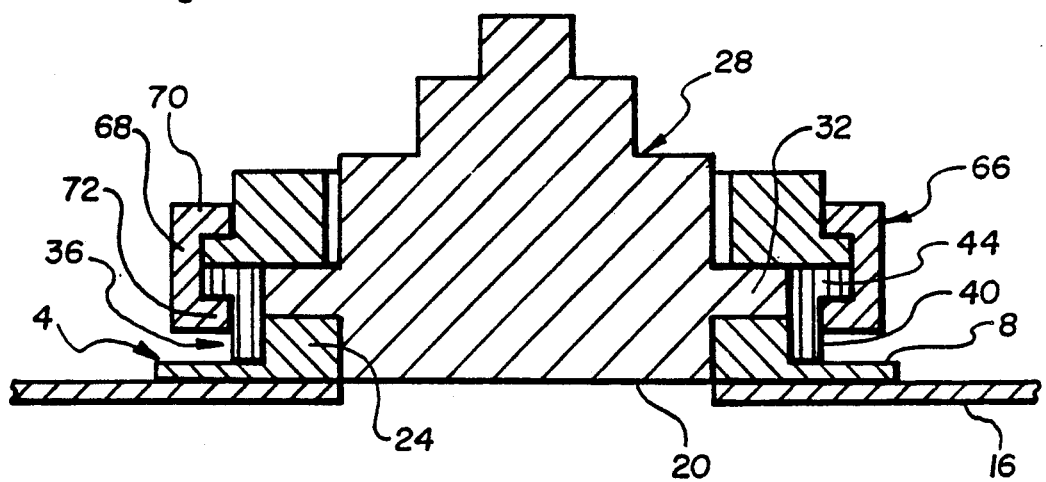
FIG. 2 shows a side, cross-sectional view of the mounting structure of FIG. 1.

The mounting structure of the drawings also includes a holding ring 50. The holding ring 50 is formed to include a laterally extending flange 54 which is generally co-extensive with the flange 44 of the bracket extension 36. Projecting upwardly from the flange 54 is an annular wall 58. The holding ring 50 is dimensioned so that the flange 54 and wall 58 overlie the flange or lip 32 of the sensor 28 when the sensor is fitted in place in an opening 46 or the extension 36, as best seen in FIG. 2. When fitted in place, a downwardly extending portion of the sensor 28 fits within the opening 46 of the extension 36, the lip 32 of the sensor rests on the projection 24 of the bracket 4, and the bolt of the sensor extends upwardly through an opening 62 in the holding ring 50, again as seen in FIG. 2.

When the sensor 28 is in place in the bracket 4, and the holding ring 50 is placed about the sensor and on the extension 36, the flanges 44 and 54 of the extension and holding ring respectively mate and project laterally substantially the same distance, as shown in FIG. 2. These flanges are secured together by a conventional V-band clamp 66. The V-band clamp 66 is formed into a ring and includes a side wall 68 and to radially inwardly projecting, spaced-apart walls 70 and 72. The inwardly projecting walls 70 and 72 are spaced apart to fit snugly above and below the flanges 54 and 44 of the holding ring 50 and extension 36 respectively to secure the flanges in a mating relationship. The circumference of the inside surface of the wall 68 is substantially the same as the circumference of the outside surface of the two flanges 54 and 44, when the clamp is in the locked position shown in FIG. 2.

The V-band clamp includes a locking element, graphically represented at 76, which in a single operation, such as screwing or unscrewing a nut 80, allows for locking the clamp or unlocking the clamp.

In the manner described, a simple, easy-to-install, and easy-to-remove mounting structure is provided for mounting a liquid-level sensor in the side wall of a tank. Although studs or bolts are used to mount the bracket 4 in the side wall of the tank, these studs or bolts need not be removed to allow removal of the sensor 28. Rather, the bracket 4 is modified by inclusion of a bracket extension 36 and holding ring 50 which, when installed as indicated and secured together by the V-band clamp 66, allows for the simple and speedy removal of the sensor and the reinstallation of the sensor.

It is to be understood that the above described embodiment of the present invention is only illustrative of the application of the principles thereof. Numerous modifications and alternative embodiments or arrangements may be devised by those skilled in the art without departing from the spirit and scope of the present invention and the appended claims are intended to cover such modifications and arrangements.

What is claimed is:

1. In a liquid container having an opening, about the perimeter of which is mounted an annular bracket for receiving a liquid level sensor, said sensor having a laterally extending lip for seating on the bracket to allow part of the sensor to be exposed through the opening, fastening apparatus for releasably holding the sensor in the bracket comprising an annular bracket extension projecting upwardly from the bracket, said extension having a laterally projecting flange at its upper end, a holding ring dimensioned to overlie the sensor lip and hold the sensor in place in the bracket, said ring mating and being generally coextensive with the flange, and a band clamp means for releasably clamping the ring to the extension.

2. Apparatus as in claim 1 wherein said clamp means comprises a gripping section moveable between a holding position, in which the gripping section holds the ring to the extension and thus the sensor in the bracket, and a releasing position, in which the gripping section releases the ring from the extension, and a manually operable means coupled to the gripping section for moving the gripping section to the holding position when operated in one direction, and to the releasing position when operated in another direction.

3. Apparatus as in claim 2 wherein said clamp means is a V-band clamp.

4. A single-mount fastener for securing a liquid level sensor in the opening of a liquid-holding vessel, said fastener including an annular bracket mounted to circumscribe the vessel opening for receiving a liquid level sensor, a portion of which overlies at least a portion of the bracket, said bracket having a laterally extending flange mounted to the vessel about the opening, and an annular projection extending upwardly from the flange and terminating in a second laterally extending flange, a holding ring disposable on the projection to overlie at least a portion of the sensor when the sensor is placed in the bracket, said holding ring including a laterally extending third flange dimensioned to mate with and overlie the second flange, and a band clamp means for releasably clamping the second flange to the third flange to thereby secure the liquid level sensor in the vessel opening.

5. A fastener as in claim 4 wherein said clamp means comprises a V-band clamp releasably disposable about the second and third flange to hold them together.

* * * * *